United States Patent
Park et al.

(10) Patent No.: US 8,903,972 B2
(45) Date of Patent: Dec. 2, 2014

(54) METHOD AND APPARATUS FOR SHARING CONTENTS USING INFORMATION OF GROUP CHANGE IN CONTENT ORIENTED NETWORK ENVIRONMENT

(75) Inventors: Joong Hong Park, Seoul (KR); Myeong Wuk Jang, Seoul (KR); Jae Hoon Kim, Yongin-si (KR); Ji Hoon Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 13/103,664

(22) Filed: May 9, 2011

(65) Prior Publication Data

US 2012/0096136 A1   Apr. 19, 2012

(30) Foreign Application Priority Data

Oct. 13, 2010 (KR) .................. 10-2010-0099813

(51) Int. Cl.
*G06F 15/173* (2006.01)
*H04L 12/18* (2006.01)

(52) U.S. Cl.
CPC ......... *H04L 12/185* (2013.01); *Y10S 707/9994* (2013.01)
USPC ........... 709/223; 709/203; 709/204; 709/219; 707/999.01; 715/751

(58) Field of Classification Search
CPC .. G06Q 50/01; G06Q 10/10; G06F 17/30699; H04L 2209/60; H04W 4/08
USPC ................. 709/203–204, 223–224, 217, 219; 707/999.01; 715/751
See application file for complete search history.

(56) References Cited

U.S. PATENT DOCUMENTS

| 6,453,354 | B1 * | 9/2002 | Jiang et al. ............. 709/229 |
| 2001/0027111 | A1 | 10/2001 | Motegi et al. |
| 2004/0076154 | A1 | 4/2004 | Mizutani et al. |

(Continued)

FOREIGN PATENT DOCUMENTS

| EP | 1 347 606 | 9/2003 |
| KR | 10-2004-0028109 | 4/2004 |
| KR | 10-2007-0093068 | 9/2007 |
| KR | 10-2009-0054111 | 5/2009 |

OTHER PUBLICATIONS

International Search Report issues Feb. 22, 2012 in counterpart International Patent Application No. PCT/KR2011/004894 (3 pages, in English).

(Continued)

*Primary Examiner* — Oanh Duong
(74) *Attorney, Agent, or Firm* — NSIP Law

(57) ABSTRACT

Provided are a method and apparatus for sharing content, using information regarding a group change in a content oriented network environment. In a case where a group to which a target user equipment belongs is changed from a first group to a second group, the target user equipment may transmit, to a first group member management device, the information regarding the group change. The first group member management device may update information about a group to which the target user equipment currently belongs, based on the information regarding the group change. In response to a receiving of a content request from a requesting user equipment, the first group member management device may transfer the content request to the target user equipment.

20 Claims, 9 Drawing Sheets

(56) References Cited

U.S. PATENT DOCUMENTS

| | | |
|---|---|---|
| 2005/0152286 A1 | 7/2005 | Betts et al. |
| 2007/0136413 A1* | 6/2007 | Ishikawa et al. ............... 709/200 |
| 2008/0154903 A1* | 6/2008 | Crowley et al. .................... 707/9 |
| 2009/0165107 A1* | 6/2009 | Tojo et al. ......................... 726/7 |
| 2009/0216760 A1 | 8/2009 | Bennett .............................. 707/5 |
| 2010/0042628 A1* | 2/2010 | Crowley et al. .................... 707/9 |
| 2010/0161752 A1* | 6/2010 | Collet et al. .................... 709/216 |
| 2011/0245944 A1* | 10/2011 | Louboutin ....................... 700/94 |
| 2012/0042013 A1* | 2/2012 | Roman et al. .................. 709/204 |
| 2012/0115511 A1* | 5/2012 | Lee ............................... 455/456.1 |
| 2012/0311039 A1* | 12/2012 | Ogawa .......................... 709/204 |

OTHER PUBLICATIONS

Yuncheng Zhu, et al., "CONIC: Content-Oriented Network with Indexed Caching," INFOCOM IEEE Conference on Computer Communications Workshops, 2010 Digital Object Identifier: 10.1109/INFCOMW.2010.5466658, pp. 1-6, Mar. 15-19, 2010 (in English).

Carzaniga, et al., "Forwarding in a Content-Based Network," Proceedings of ACM SIGCOMM 2003, pp. 163-174, Karlsruhe, Germent, Aug. 25-29, 2003 (in English).

\* cited by examiner

METHOD AND APPARATUS FOR SHARING CONTENTS USING INFORMATION OF GROUP CHANGE IN CONTENT ORIENTED NETWORK ENVIRONMENT

CROSS-REFERENCE TO RELATED APPLICATION(S)

This application claims the benefit under 35 U.S.C. §119(a) of Korean Patent Application No. 10-2010-0099813, filed on Oct. 13, 2010, in the Korean Intellectual Property Office, the entire disclosure of which is incorporated herein by reference for all purposes.

BACKGROUND

1. Field

The following description relates to a method and apparatus for sharing content in a content oriented network environment.

2. Description of Related Art

A user may request content from another party rather than request a connection to the other party. However, to share content using an end-to-end connection technology based on Internet protocol (IP) of contemporary Internet structure, the user may receive information regarding an IP address of a counterpart device. Further, a connection link between the IP address of the counterpart device and an IP address of the user's device may be formed. To share the content, the user may use a third server for content sharing. Thus, the end-to-end connection technology based on IP may have difficulties in supporting a content sharing service that is based on the content.

A content oriented networking (CON) scheme focuses on sharing content requested by the user. As one example of a representative technology, a Content Centric Network scheme may be provided.

In a CON scheme, when the user transmits a request for content, a device (that is, a terminal, an intermediate node, and the like) that stores the corresponding content may transmit the content. The CON scheme may be referred to as a "content request→content transmit" scheme. A request message of the user may include metadata including information regarding file attributes, such as a format, a size, a drafter, a generation date, and the like, and a name of the content requested by the user. A device storing the corresponding content, among devices receiving the request message of the user, may enable the content to be shared by responding to the request message of the user.

SUMMARY

In one general aspect, there is provided a content sharing method of a target user equipment in a content oriented network, the method including transmitting, to a first group member management device, information regarding a group change if a group to which the target user equipment belongs is changed from a first group to a second group, receiving, from the first group member management device, a request transmitted from a requesting user equipment with respect to the target content, and transmitting the target content to the requesting user equipment in response to the receiving of the request of the requesting user equipment, wherein the first group member management device receives the request of the requesting user equipment with respect to the target content generated by the target user equipment while belonging to the first group.

The information regarding the group change may include identification information of the target user equipment and information regarding the second group.

The information regarding the group change may further include information regarding a second group member management device included in to the second group.

The receiving may include receiving the request from the first group member management device through the second group member management device.

The transmitting of the information regarding the group change may include transmitting, to the first group member management device, information regarding the group change, if a group to which the target user equipment belongs is changed from the first group, to at least one intermediate group, and subsequently to the second group.

The method may further include transmitting the information regarding the group change to each intermediate group member management device that corresponds to each intermediate group to which the target user equipment previously belonged while the target user equipment generated a content, among the at least one intermediate group.

The transmitting of the target content may further include transmitting the target content to the requesting user equipment through a second group member management device included in the second group.

The target user equipment may generate a first content in the first group, move to the second group, generate a second content in the second group, and move to a third group, wherein the target user equipment transmits information regarding a group change from the first group to the second group and the user equipment transmits information regarding a group change from the second group to the third group.

In another general aspect, there is provided a content sharing method of a first group member management device included in a first group of a content oriented network, the method including receiving, from a target user equipment, information regarding a group change of the target user equipment if where a group to which the target user equipment belongs changes from a first group to a second group, updating a member management table, the member management table including information regarding a group to which each of at least one user equipment currently belongs, based on the information regarding the group change, and transferring a request of a requesting user equipment to the target user equipment using the member management table, if where the first group member management device receives the request of the requesting user equipment with respect to a target content generated by the target user equipment, while the target user equipment belongs to the first group, wherein each of the at least one user equipment previously belonged to the first group.

The information regarding the group change may include identification information of the target user equipment and information regarding the second group.

The information regarding the group change may further include information regarding a second group member management device corresponding to the second group.

The transferring may further include transferring the request of the requesting user equipment to the target user equipment through a second group member management device corresponding to the second group.

The first group member management device may be included in a predetermined user equipment belonging to the first group.

When the first group member management device is included in the predetermined user equipment belonging to the first group, and a group to which the predetermined user equipment belongs is changed to a third group, the method may further include transmitting the member management table to a user equipment belonging to the first group other than the predetermined user equipment.

The first group member management device may be included in a server system belonging to the first group.

The method may further include receiving the target content from the target user equipment, and transferring the target content to the requesting user equipment.

The receiving of the target content from the target user may include receiving the target content through a second group member management device included in the second group.

The method may further include storing the target content, and transmitting the stored target content to a second requesting user equipment if receiving a request for the target content is received from the second requesting user equipment.

The target content may be stored in response to the first group member management device receiving at least a predetermined number of requests for the target content.

In still another general aspect, there is provided a target user equipment sharing a content in a content oriented network, the target user equipment including a group change information transmitting unit to transmit, to a first group member management device, information regarding a group change if a group to which the target user equipment belongs is changed from a first group to a second group, a receiving unit to receive, from the first group member management device, a request transmitted from a requesting user equipment with respect to the target content, and a content transmitting unit to transmit the target content to the requesting user equipment in response to the receiving of the request of the requesting user equipment, wherein the first group member management device receives the request of the requesting user equipment with respect to the target content generated by the target user equipment while belonging to the first group.

The information regarding the group change may include identification information of the target user equipment and information regarding the second group.

When a group to which the target user equipment belongs is changed from the first group, to at least one intermediate group, and subsequently to the second group, the group change information transmitting unit may transmit, to the first group member management device, the information regarding the group change.

The group change information transmitting unit may transmit the information regarding the group change to each intermediate group member management device that corresponds to each intermediate group to which the target user equipment previously belonged, while the target user equipment generated a content, among the at least one intermediate group.

According to one example, a content sharing method may determine a group to which a user equipment belongs. If the group to which the user equipment belongs is changed by transferring a content request to a corresponding user equipment using information regarding a group to which the user equipment currently belongs, network efficiency may be improved.

According to another example, a group member management device may transfer, to a corresponding user equipment, a request transmitted from a requesting user equipment requesting content, using information regarding a group to which the user equipment currently belongs. Accordingly, a number of network hops for transferring a request for a content transmission may be reduced.

According to another example, when a group to which a user equipment belongs is changed, the user equipment may transmit information regarding the group change to a group member management device associated with the group of the user equipment prior to the group change. Accordingly, the group member management device may be informed of a group to which the group member management device currently belongs.

Other features and aspects will be apparent from the following detailed description, the drawings, and the claims.

Figure 1:
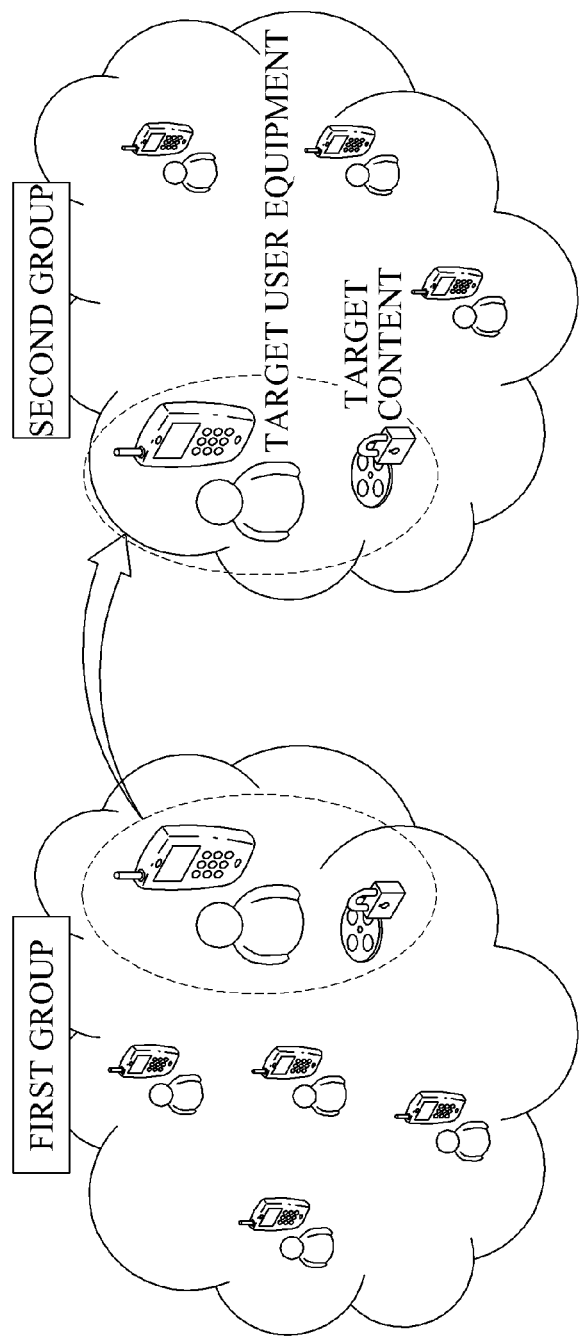
FIG. 1 is a diagram illustrating an example in which a group to which a target user equipment belongs is changed.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining an understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

In the following descriptions, content may indicate data, and a user equipment may include a device or a node capable of transmitting content. Examples of a user equipment include a cell phone, an MPEG Audio Layer-3 (MP3) device, a camcorder, a camera, and the like.

A content oriented networking (CON) system may provide content regardless of a location of a user equipment that stores the content. A "content request→content transmit" scheme may be implemented so as to not use an identifier of the user equipment that stores the content.

As opposed to a networking system based on an Internet protocol (IP), in which information regarding a location of a predetermined user equipment is significant, the CON system may instead rely upon a content name to route and transmit content. The content name may be determined based on information regarding a generator (that is, a user equipment generating the content) information regarding a configuration of the system, and information regarding a group to which the generator belongs. The group may use identification information, such as a name of user equipment that currently belong to the group, for a request or a transmission of the content.

However, the group to which the user equipment belongs may change. For example, the content name may be determined based on the information regarding the generator generating the content and the information regarding the group to which the generator belongs. Accordingly, if the group to which the user equipment belongs is changed, it may be difficult to share content generated in the group to which the user equipment previously belongs.

Accordingly, when a group to which a user equipment belongs is changed, examples described herein may provide a method of receiving a request for content generated in the group to which the user equipment previously belongs, and transmitting the corresponding content.

FIG. 1 illustrates an example in which a group to which a target user equipment belongs is changed.

Referring to FIG. 1, each of a first group and a second group may include a plurality of user equipments.

In the following description of FIG. 1, an example is described where target user equipment may be assumed to generate a target content, while the target user equipment belongs to the first group. A target content name may be determined based on identification information of the target user equipment and based on information regarding the first group. For example, the target content name may be determined in a form of "first group/target user equipment/target content".

Since a CON system may request and transmit content by performing routing based on a content name, problems may arise in the routing if the target user equipment moves from the first group to the second group as illustrated in FIG. 1. For example, a problem may occur due to content generated in the first group moving to the second group when the target user equipment changes the group. Accordingly, a user equipment of a third group that requests the target content may not be able to find the target user equipment and the target content in the first group.

To solve the problem in the above example, a scheme of modifying name(s) of content generated in the previous group using information about a subsequent group may be applied when the group of the target user equipment changes. However, the scheme may be inefficient. Further, if the name of content changes in a CON system, the content may be recognized as a totally different content.

As an example of another scheme, the target user equipment may add a new routing path to a neighboring router each time a group to which the target user equipment belongs is changed. However, updating of a routing table may be delayed depending on the particular environment of a network infrastructure. Thus, content sharing may not be performed immediately after the group to which the target user equipment belongs is changed. If the group to which the target user equipment belongs is easily changed according to a characteristic of the group, or if the target user equipment frequently moves, a complexity of the routing table may increase, thereby reducing networking performance.

Figure 2:
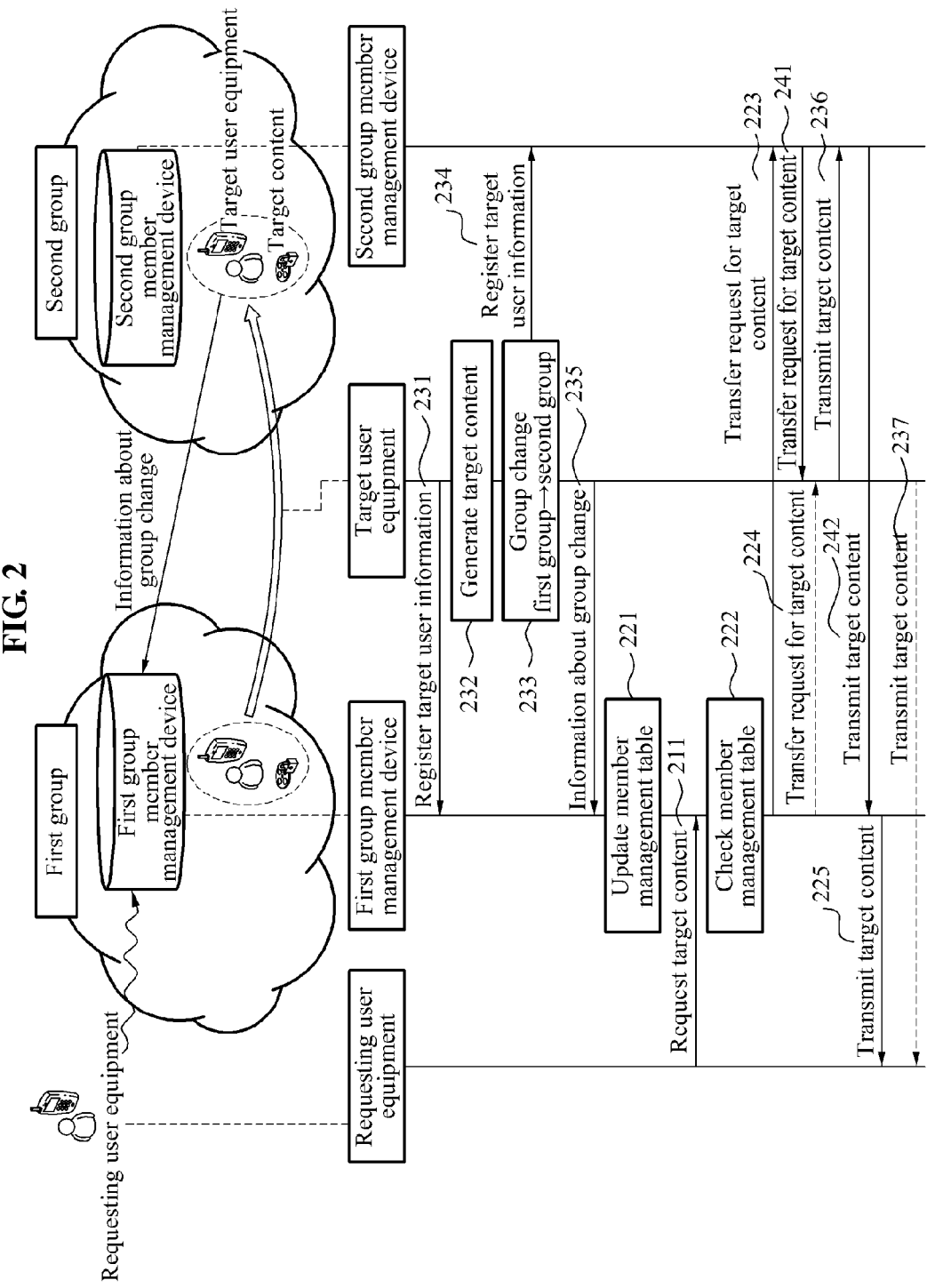
FIG. 2 is a diagram illustrating an example of a scheme of sharing content when a group to which a target user belongs is changed.

FIG. 2 illustrates an example of a scheme of sharing content if a group to which a target user belongs is changed.

Referring to FIG. 2, each group (that is, a first group and a second group) may include a group member management device (that is, a first group member management device and a second group member management device). Each of user equipments may register information of each of the user equipments in a group member management device of a corresponding group. When a group to which a user equipment belongs is changed, information regarding the group change may be registered in the group member management device of the previous group.

The information regarding the group change may include identification information of the user equipment of a group that is changed and information about a changed group. The information regarding the group change may also include information about the group member management device of the changed group.

When the group to which the user equipment belongs is changed again, information regarding the group change according to the corresponding change may be registered in group member management devices of all the groups the user equipment has passed through. If content is not generated while the user equipment belongs to a predetermined group, the user equipment may not register information regarding the group change in the corresponding predetermined group.

Referring to FIG. 2, in operation 231, a target user equipment may register information of the target user equipment with the first group member management device. In operation 232, the target user equipment may generate the target content, if the target user equipment belongs to the first group.

When a group to which the target user equipment belongs is changed from the first group to the second group in operation 233, the target user equipment may register information of the target user equipment with the second group member management device in operation 234. In operation 235, the target user equipment may transmit, to the first group member management device, information regarding the group change from the first group to the second group.

In operation 221, the first group member management device may update a member management table based on the information regarding the group change. The member management table may include information about a group to which each of at least one user equipment currently belongs, where the at least one user equipment previously belonged to the first group. A persistent updating may permit the first group member management device to periodically or continuously check the group to which the target user equipment currently belongs.

In operation 211, a requesting user equipment requesting the target content may transmit a request for the first requesting user equipment to transmit the target content, since a target content name in a content oriented network (CON) system may be determined based on identification information of the target user equipment and information regarding the first group corresponding to the group to which the target user equipment belongs. Where the first group is the group to which the target user equipment previously belonged while the target content was generated, the requesting user equipment may request the first group to transmit the target content, rather than the second group to which the target user currently belongs.

As another example, the requesting user equipment may belong to a third group, and the requesting user equipment may correspond to a user equipment belonging to the first group or the second group.

In operation 222, the first group member management device receiving the request for the target content may check the group to which the target user equipment currently belongs (that is, the second group), using the member management table.

In operation 224, the first group member management device may transfer, to the target user equipment belonging to the second group, the request transmitted from the requesting user equipment with respect to the target content. The first group member management device may transfer the request for the target content to the second group member management device in operation 223, and the second group member management device may transfer the request for the target content to the target user equipment in operation 241.

In operation 237, the target user equipment receiving the request for the target content may transmit the target content to the requesting user equipment. The target user equipment may transmit the target content to the second group member management device in operation 236, the second group member management device may transmit the target content to the first group member management device in operation 242, and the first group member management device may transmit the target content to the requesting user equipment in operation 225. Accordingly, the requesting user equipment may receive the target content.

The user equipment requesting the content may transmit a request to the member management device of the group to which a content generator previously belonged while the content was generated. The member management device of the corresponding group may transfer the request for the content to the user equipment of the group that stores the content. Thus, a relatively small amount of content may be shared if the user equipment changes the group to which the user equipment belongs. Accordingly, a number of network hops used for content sharing may be reduced.

Figure 3A:
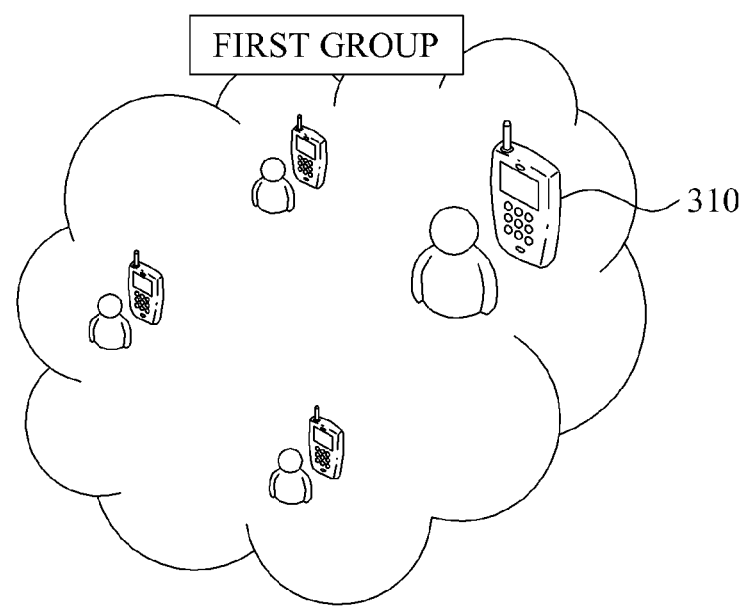
FIG. 3A and FIG. 3B are diagrams illustrating examples of a group member management device.
Figure 3B:
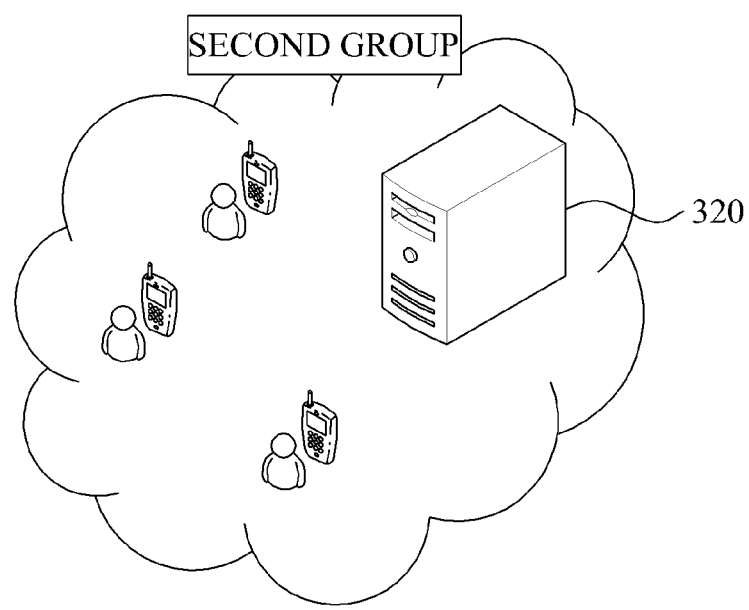

FIG. 3A and FIG. 3B illustrate examples of a group member management device.

A group member management device may be included in a predetermined user equipment belonging to a corresponding group or in a server system belonging to a corresponding group. The predetermined user equipment including the group member management device may be referred to as an owner user equipment.

An owner user equipment 310 of a first group is illustrated in FIG. 3A, and a server system 320 is illustrated in FIG. 3B. The owner user equipment 310 may include a first group member management device, and the server system 320 may include a second group member management device.

In response to the owner user equipment 310 moving to the second group, a member management table of the owner user equipment 310 may be transmitted to another user equipment in the first group. Further, information regarding a status of the owner user equipment 310 may be transmitted to another user equipment.

Figure 4:
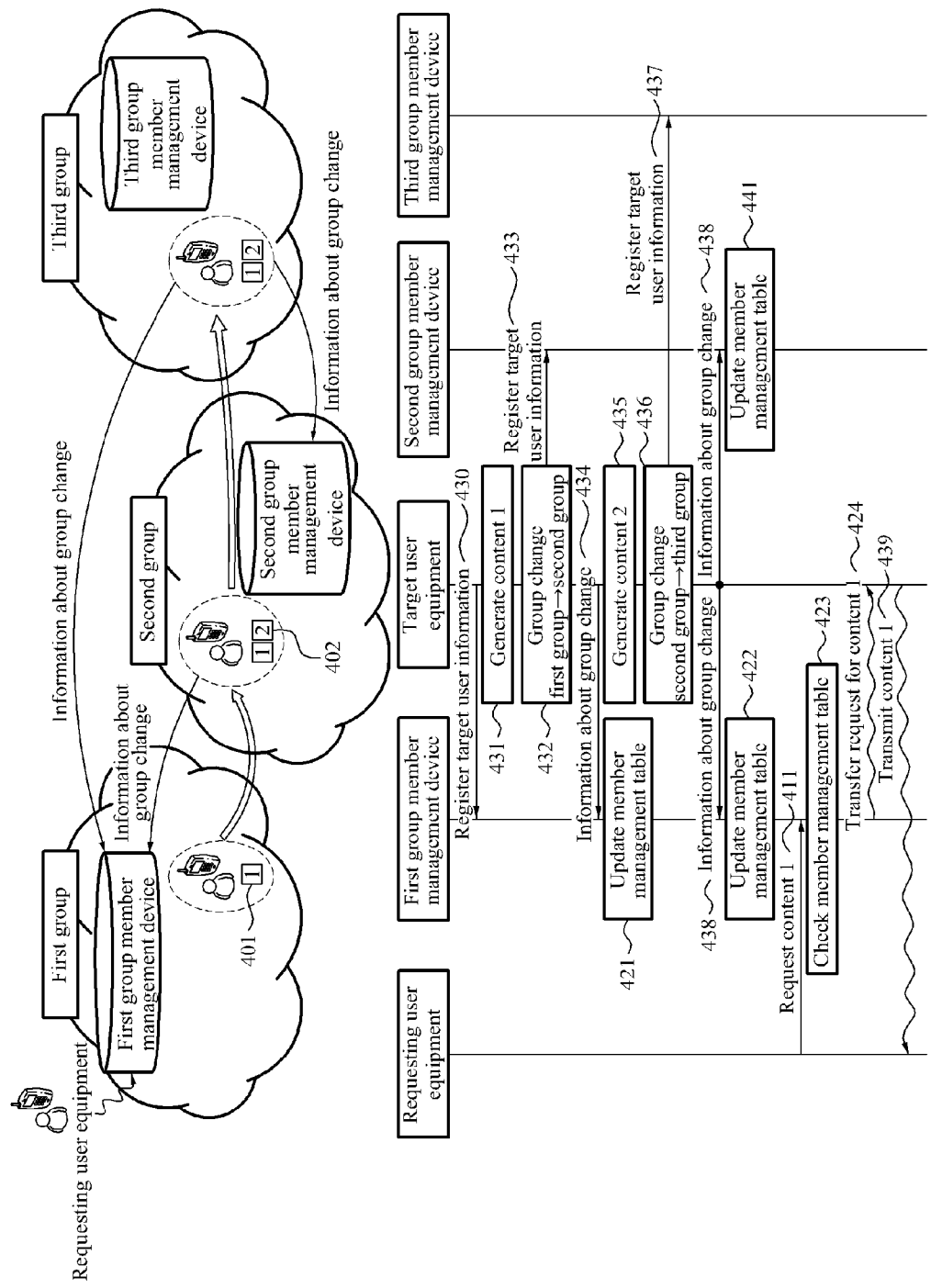
FIG. 4 is a diagram illustrating an example of sharing content when a group to which a target user belongs is changed a plurality of times.

FIG. 4 illustrates an example of sharing content when a group to which a target user belongs is changed a plurality of times.

In the following description of FIG. 4, an example is described where target user equipment may be assumed to generate a content (1) 401 in a first group, to generate a content (2) 402 in a second group, and to move to a third group.

In operation 430, the target user equipment may register information of the target user equipment with a first group member management device. In operation 431, the target user equipment may generate content (1) 401, if the target user equipment belongs to the first group.

In response to a group to which the target user equipment belongs changing from the first group to the second group in operation 432, the target user equipment may register the information of the target user equipment with a second group member management device in operation 433. In operation 434, the target user equipment may transmit, to the first group member management device, information regarding the group change from the first group to the second group.

In operation 421, the first group member management device may update a member management table of the first group member management device, based on the information regarding the group change from the first group to the second group.

In operation 435, the target user equipment may generate content (2) 402, if the target user equipment belongs to the second group.

When a group to which the target user equipment belongs is changed from the second group to a third group in operation 436, the target user equipment may register the information of the target user equipment with a third group member management device in operation 437. In operation 438, the target user equipment may transmit, to the first group member management device in addition to the second group member management device, information regarding the group change from the second group to the third group. Accordingly, the information regarding the group change may be transmitted to group member equipments of the group to which the target user equipment previously belonged.

In operation 422, the first group member management device may update the member management table of the first group member management device, based on the information regarding the group change from the second group to the third group. In operation 441, the second group member management device may update the member management table of the second group member management device, based on the information regarding the group change from the second group to the third group.

In operation 411, a requesting user equipment requesting content (1) 401 may transmit a request for the first group member management device to transmit content (1) 401. If the requesting user equipment transmits a request for the content (2) 402, the requesting user equipment may request the second group member management device to transmit content (2) 402.

In operation 423, the first group member management device receiving the request for content (1) 401 may check the group to which the target user equipment currently belongs (that is, the third group), using the member management table of the first group member management device.

In operation 424, the first group member management device may transfer, to the target user equipment belonging to the third group, the request transmitted from the requesting user equipment with respect to content (1) 401. The request for content (1) 401 may be transferred to the target user equipment through the third group member management device.

In operation 439, the target user equipment receiving the request for content (1) 401 may transmit content (1) 401 to the requesting user equipment. Content (1) 401 may be transferred to the requesting user equipment through the third group member management device and the first group member management device. Content (1) 401 may be transferred from the target user equipment to the requesting user equipment through the first group member management device.

Accordingly, if the target user equipment changes the group to which the target user equipment belongs a plurality of times, each group member management device may still transfer the content request to the target user equipment due to transmission of the information regarding the group change to group member management devices of groups to which the target user equipment previously belongs.

If the target user equipment does not generate the content, the target user equipment may not transfer the information regarding the group change to the group member management device of a predetermined group, while the target user equipment belongs to the predetermined group.

As one example, the target user equipment may move to a fourth group without generating any content in the third group. Accordingly, the target user equipment may merely transmit information regarding the group change (that is, the group change from the third group to the fourth group) to the first group member management device and the second group member management device. Further, the target user may not transmit the information regarding the group change (that is, the group change from the third group to the fourth group) to the third group member management device. Thus, network efficiency may be improved.

Figure 5:
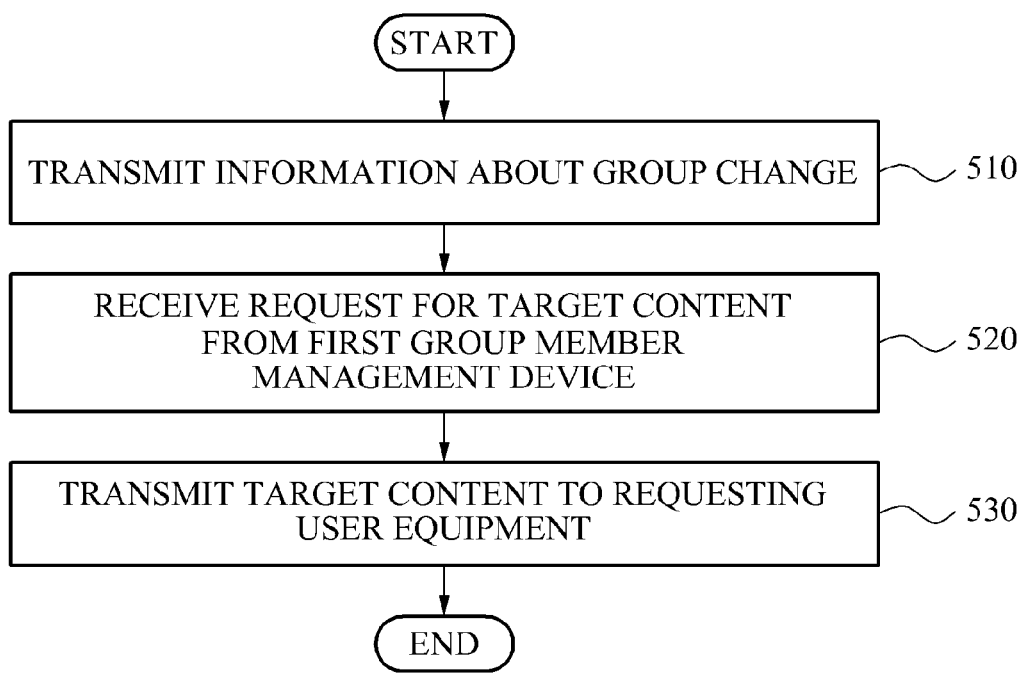
FIG. 5 is a flowchart illustrating an example of a scheme of sharing content of a target user equipment based on a content oriented network.

FIG. 5 illustrates an example of a scheme of sharing content of a target user equipment based on a content oriented network.

Referring to FIG. 5, in operation 510, the target user equipment may transmit, to a first group member management device, information regarding a group change if a group to which the target user equipment belongs is changed from a first group to a second group. Accordingly, the first group member management device of the first group may transfer a request of a requesting user equipment to the target user equipment. Here, the first group member management device may receive the request transmitted from the requesting user equipment with respect to a target content generated by the target user equipment while belonging to the first group. Also, as an example, the group to which the target user equipment belongs may change from the first group, to at least one intermediate group, and subsequently to the second group.

The target user equipment may transmit the information regarding the group change to each intermediate group member management device corresponding to each intermediate group to which the target user equipment previously belonged while the target user equipment was generating content, among the at least one intermediate group.

In operation 520, the target user equipment may receive, from the first group member management device, the request transmitted from the requesting user equipment with respect to the target content. The target user equipment may receive the request from the first group member management device through a second group member management device.

In operation 530, the target user equipment may transmit the target content in response to receiving of the request transmitted from the requesting user equipment. The target user equipment may transmit the target content to the requesting user equipment through the second group member management device.

Figure 6:
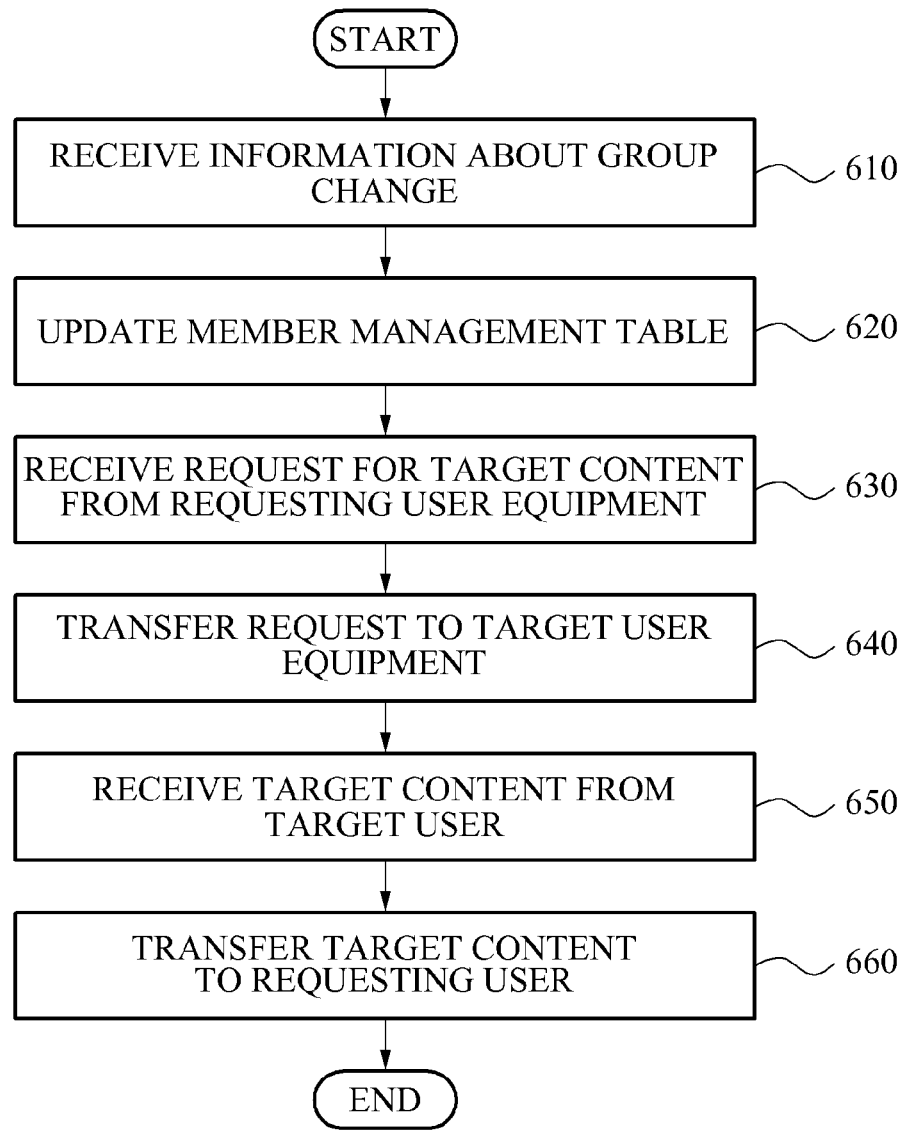
FIG. 6 is a flowchart illustrating an example of a scheme of sharing content of a first group member management device based on a content oriented network.

FIG. 6 illustrates an example of a scheme of sharing content of a first group member management device based on a content oriented network.

Referring to FIG. 6, in operation 610, if a group to which a target user equipment belongs is changed from a first group to a second group, the first group member management device may receive, from the target user equipment, information regarding the group change of the target user equipment.

In operation 620, the first group member management device may update a member management table including information regarding a group to which each of at least one user equipment currently belongs, based on the information regarding the group change. Here, the each of the at least one user equipment previously belonged to the first group.

In operation 630, the first group member management device may receive a request transmitted from a requesting user equipment with respect to a target content generated by the target user equipment, while the target user equipment belongs to the first group.

In operation 640, the first group member management device may transfer the request to the target user equipment, using the member management table. Here, the request may be transferred to the target user equipment through a second group member management device.

In operation 650, the first group member management device may receive the target content from the target user equipment. Here, the first group member management device may receive the target content through the second group member management device.

In operation 660, the first group member management device may transfer the target content to the requesting user equipment.

In the examples described above, if the target content is requested at least a predetermined number of times, the first group member management device may store the target content in a memory of the first group member management device. Accordingly, the first group member management device may operate as a cache to transmit the target content to user equipments requesting the target content, without transferring the request for the target content to the target user equipment.

Further in the examples described above, if the first group member management device is included in an owner user equipment, and the owner user equipment moves from the first group to the second group, the first group member management device may transmit the member management table to another user equipment in the first group. Accordingly, a status as the owner user equipment may be transferred to another user equipment.

The processes, functions, methods and/or software described herein including a content sharing method may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Figure 7:
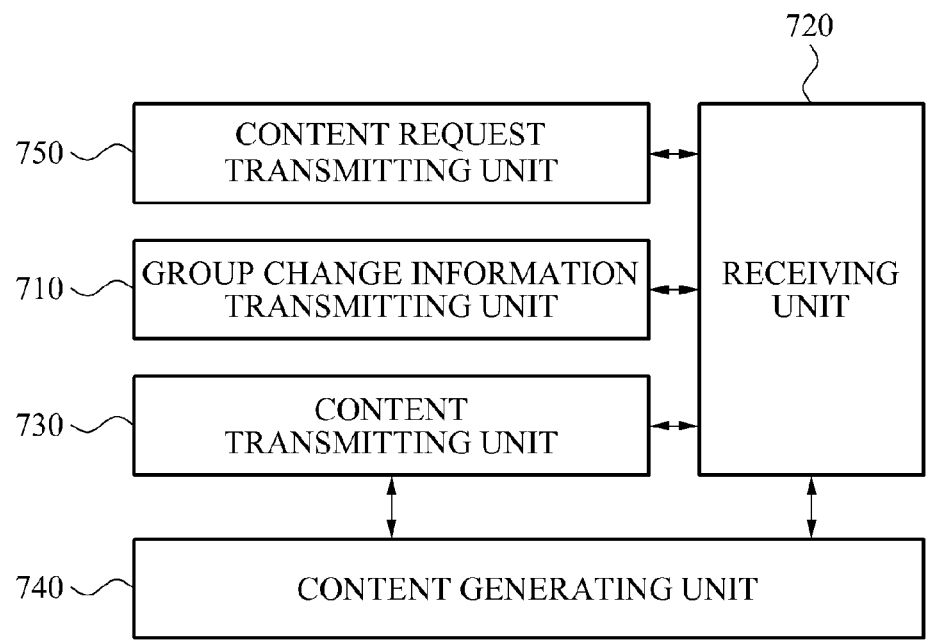
FIG. 7 is a block diagram illustrating an example of a target user equipment for sharing content in a content oriented network.

FIG. 7 illustrates an example of a target user equipment for sharing content in a content oriented network.

Referring to FIG. 7, the target user equipment may include a group change information transmitting unit 710, a receiving unit 720, a content transmitting unit 730, a content generating unit 740, and a content request transmitting unit 750.

When a group to which the target user equipment belongs is changed from a first group to a second group, the group change information transmitting unit 710 may transmit information regarding the group change to a first group member management device.

The receiving unit 720 may receive, from the first group member management device, a request transmitted from a requesting user equipment with respect to a target content.

The content transmitting unit 730 may transmit the target content to the requesting user equipment in response to the receiving of the request of the requesting user equipment.

The content generating unit 740 may generate a content.

The content request transmitting unit 750 may request a group member management device for a predetermined content.

Figure 8:
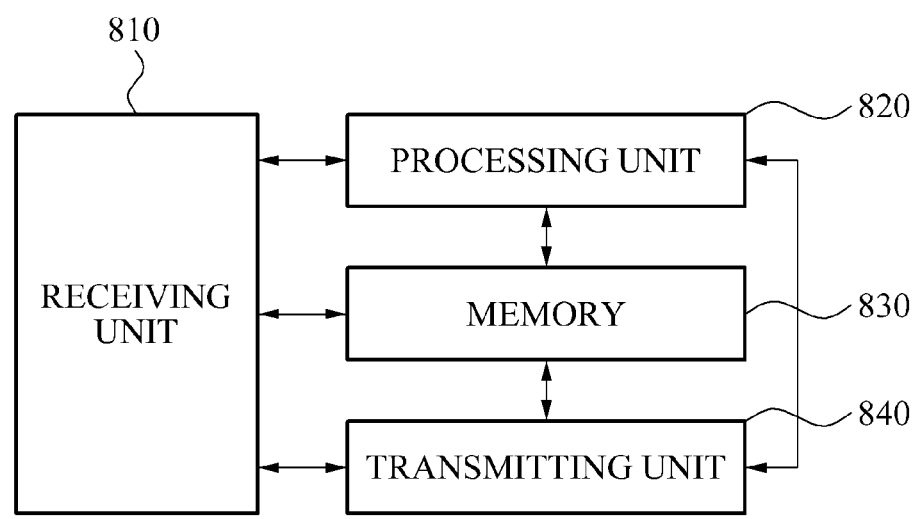
FIG. 8 is a block diagram illustrating an example of a first group member management device for sharing content in a content oriented network.

FIG. 8 illustrates an example of a first group member management device for sharing content in a content oriented network.

Referring to FIG. 8, the first group member management device corresponding to a first group may include a receiving unit 810, a processing unit 820, a memory 830, and a transmitting unit 840.

If a group to which a target user equipment belongs is changed from the first group to a second group, the receiving unit 810 may receive, from the target user equipment, information regarding the group change of the target user equipment. The receiving unit 810 may receive a request transmitted from a requesting user equipment with respect to a target content generated by the target user equipment, while the target user equipment belongs to the first group.

The processing unit 820 may update a member management table including information regarding a group to which each of at least one user equipment currently belongs, based on the information regarding the group change. Here, the each of the at least one user equipment previously belonged to the first group.

The memory 830 may store the member management table. The memory 830 may store the target content so that the first group member management device may be used as a cache.

The transmitting unit 840 may transfer the request of the requesting user equipment to the target user equipment, using the member management table. The transmitting unit 840 may transfer the target content to the requesting user equipment.

The target user equipment and the first group member management device have been described above. Since various examples described with reference to FIG. 1 through FIG. 6 may be applied to the target user equipment and the first group member management device as they are, further descriptions will be omitted for brevity and clarity.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A content sharing method of a target user equipment in a content oriented network, comprising:
   transmitting, to a first group member management device, information regarding a group change in response to a group to which the target user equipment belongs being changed from a first group to a second group, wherein a target content is generated while the target user equipment belongs to the first group;
   receiving, from the first group member management device, a request transmitted from a requesting user equipment with respect to the target content, wherein the receiving comprises receiving the request from the first group member management device through a second group member management device included in the second group; and
   transmitting the target content to the requesting user equipment in response to the receiving of the request of the requesting user equipment,
   wherein the first group member management device receives the request of the requesting user equipment with respect to the target content generated by the target user equipment while belonging to the first group.

2. The method of claim 1, wherein the information regarding the group change comprises identification information of the target user equipment and information regarding the second group.

3. The method of claim 2, wherein the information regarding the group change further comprises information regarding a second group member management device included in the second group.

4. The method of claim 1, wherein the transmitting of the information regarding the group change comprises transmitting, to the first group member management device, information regarding the group change, in response to a group to which the target user equipment belongs being changed from the first group, to at least one intermediate group, and subsequently to the second group.

5. The method of claim 4, further comprising:
   transmitting the information regarding the group change to each intermediate group member management device that corresponds to each intermediate group to which the target user equipment previously belonged while the target user equipment generated a content, among the at least one intermediate group.

6. The method of claim 5 further comprising updating a member management table of the first group member management device, based on information regarding the group change from intermediary group to the second group of the target user equipment.

7. The method of claim 1, wherein the transmitting of the target content further comprises transmitting the target content to the requesting user equipment through a second group member management device included in the second group.

8. A content sharing method of a first group member management device included in a first group of a content oriented network, comprising:
   receiving, from a target user equipment, information regarding a group change of the target user equipment in response to a group to which the target user equipment belongs changing from a first group to a second group, wherein a target content is generated while the target user equipment belongs to the first group;
   updating a member management table, the member management table including information regarding a group to which each of at least one user equipment currently belongs, based on the information regarding the group change; and
   transferring a request of a requesting user equipment to the target user equipment using the member management table, in response to the first group member management device receiving the request of the requesting user equipment with respect to a target content generated by the target user equipment while the target user equipment belongs to the first group, wherein the transferring further comprises transferring the request of the requesting user equipment to the target user equipment through a second group member management device corresponding to the second group, and wherein each of the at least one user equipment previously belonged to the first group.

9. The method of claim 8, wherein the information regarding the group change comprises identification information of the target user equipment and information regarding the second group.

10. The method of claim 9, wherein the information regarding the group change further comprises information about a second group member management device corresponding to the second group.

11. The method of claim 8, wherein the first group member management device is included in a server system or a predetermined user equipment belonging to the first group.

12. The method of claim 11, wherein, in response to the first group member management device being included in the predetermined user equipment belonging to the first group, and a group to which the predetermined user equipment belongs is changed to a third group, the method further comprises:

transmitting the member management table to a user equipment belonging to the first group other than the predetermined user equipment.

13. The method of claim 8, further comprising:

receiving the target content from the target user equipment; and transferring the target content to the requesting user equipment.

14. The method of claims 13, wherein the receiving of the target content from the target user comprises receiving the target content through a second group member management device included in the second group.

15. The method of claim 13, further comprising:

storing the target content; and transmitting the stored target content to a second requesting user equipment in response to a request for the target content being received from the second requesting user equipment.

16. The method of claim 15, wherein the target content is stored in response to the first group member management device receiving at least a predetermined number of requests for the target content.

17. A target user equipment sharing a content in a content oriented network, comprising:

a module configured to transmit, to a first group member management device, information regarding a group change in response to a group to which the target user equipment belongs being changed from a first group to a second group, wherein a target content is generated while the target user equipment belongs to the first group;

an electronic circuit configured to receive, from the first group member management device, a request transmitted from a requesting user equipment with respect to the target content, wherein the receiving comprises receiving the request from the first group member management device through a second group member management device included in the second group; and a content transmitting module configured to transmit the target content to the requesting user equipment in response to the receiving of the request of the requesting user equipment, wherein the first group member management device receives the request of the requesting user equipment with respect to the target content generated by the target user equipment while belonging to the first group.

18. The target user equipment of claim 17, wherein the information regarding the group change comprises identification information of the target user equipment and information regarding the second group.

19. The target user equipment of claim 17, wherein, in response to a group to which the target user equipment belongs being changed from the first group, to at least one intermediate group, and subsequently to the second group:

the group change information transmitting unit transmits, to the first group member management device, the information regarding the group change.

20. The target user equipment of claim 19, wherein the group change information transmitting unit transmits the information regarding the group change to each intermediate group member management device that corresponds to each intermediate group to which the target user equipment previously belonged while the target user equipment generated a content, among the at least one intermediate group.

* * * * *